Figures 1, 2, 3:
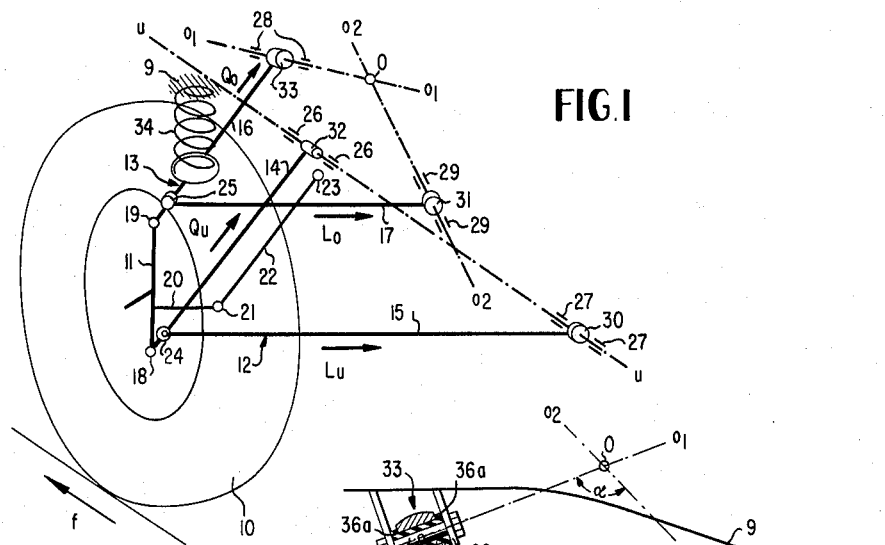

INVENTOR.
ALF JOHN MÜLLER

BY Dicke + Craig

ATTORNEYS

United States Patent Office 3,257,121
Patented June 21, 1966

3,257,121
WHEEL SUSPENSION
Alf John Müller, Stuttgart-Bad Cannstatt, Germany, assignor to Daimler-Benz Aktiengesellschaft, Stuttgart-Unterturkheim, Germany
Filed Nov. 27, 1963, Ser. No. 326,541
Claims priority, application Germany, Dec. 1, 1962,
D 40,420
9 Claims. (Cl. 280—96.2)

The present invention relates to a wheel suspension, especially for motor vehicles, by means of one or preferably two guide members, one disposed above the other, and constructed in the manner of triangular guide arms. Such types of triangular guide members which are utilized as a rule as transverse guide members with swinging axes extending approximately in the vehicle longitudinal direction or somewhat obliquely thereto, are known per se in the prior art. Furthermore, such triangular guide members have also been composed already of individual parts, for example, by threadably connecting at the one guide arm a support rod serving as the other guide arm. Both guide arms in this case form together a rigid unit.

The present invention, above all, aims at such a construction of the guide members in the manner of triangular guide arm structures such that the longitudinal and transverse forces are absorbed by the guide member particularly advantageously, especially elastically, that any undesirable influence on the steering kinematics is avoided notwithstanding the elasticity, and that additionally a construction of the guide members is achieved that is favorable from a manufacturing point of view.

The present invention accordingly consists in that the guide member or the guide members are composed of a cross member and of a longitudinal member pivotally connected thereto in such a manner that the cross member absorbs essentially only the transverse forces and the longitudinal member essentially only the longitudinal forces.

Preferably the longitudinal and cross members are thereby each connected elastically, especially by means of rubber bushings, with the vehicle superstructure. Furthermore, the connection of the longitudinal and cross members with one another may also be provided by the interposition of elastic elements, especially rubber bushings.

The following advantages result from the present invention: by reason of the pivotal connection of longitudinal and cross members in such a manner that longitudinal and transverse forces are transmitted separately by these members to the vehicle superstructure, the guide member bearing support can be adapted and matched separately to these forces. This is particularly of advantage with elastic bearing supports of the longitudinal and cross members, for example, by means of rubber bushings, since the rubber bushings may in that case be so dimensioned without difficulty as is most favorable for the absorption of the respective forces.

It is particularly advantageous if the elastic element or the elastic elements for the absorption of the longitudinal forces are constructed relatively soft and the elastic element or the elastic elements for the absorption of the transverse forces are constructed relatively hard. A large yieldingness or softness in the absorption of the longitudinal forces may be attained in particular when the wheel is carried by the transverse member of the guide structure or guide structures and the longitudinal member of the guide structure is elastically connected with the transverse member carrying the wheel. By reason of the double interposition of rubber elements realized in this case, there is achieved a particularly soft longitudinal spring support and therewith a soft rolling-off of the vehicle over bad roads. A separate auxiliary frame suspended in rubber is not necessary thereby notwithstanding the attainment of an equally soft longitudinal spring support.

On the other hand, the transverse spring support can be chosen relatively hard independently of the longitudinal spring support whereby an accurate steering can be achieved which is desirably free from elastic influences. This is the case in particular when the steering rod connected to the steering lever of the wheel steering pin is disposed parallel to the transverse guide members and therewith any steering unrest is avoided.

By the subdivision of the guide arm structures into pivotally connected guide members, it is furthermore possible to make the support base of the guide structure very large and therewith to reduce considerably the occurring forces, which contributes considerably to a light-weight type of construction in the vehicle manufacture.

By dividing each guide structure into two parts, the individual guide elements may be constructed and shaped in a very simple manner from a manufacturing point of view. Additionally, the two-partite guide structures according to the present invention are not as sensitive to tolerances as the unitary structures because frame tolerances or inaccuracies can be compensated far-reachingly by reason of the angular movability of the guide members.

A particular advantage of the wheel suspension in accordance with the present invention consists in that the caster and camber adjustment of the wheel can be realized in a simple manner. For example, an eccentric connection may serve for that purpose which is provided in the pivot point between the longitudinal and cross member of the one guide structure, preferably within the pivot joint of the longitudinal and cross members of the lower one of two superposed guide structures.

It is not necessary that the cross member of the guide structure and the longitudinal member of the guide structure are arranged perpendicular and parallel to the longitudinal direction of the vehicle, respectively. The arrangemnet may also be made in such a manner that the cross member and/or the longitudinal member each form an angle to the longitudinal direction of the vehicle, especially in such a manner that the cross member is inclined by more than 45° to the vehicle longitudinal direction whereas the longitudinal member is inclined by less than 45° to the vehicle longitudinal direction.

Accordingly, it is an object of the present invention to provide a wheel suspension utilizing triangular guide members which eliminates the drawbacks and shortcomings mentioned hereinabove and normally encountered with the prior art suspensions, by extremely simple means that are very advantageous as well as reliable in operation.

Another object of the present invention resides in the provision of a wheel suspension for steerable wheels in which the longitudinal and transverse forces are advantageously, particularly elastically absorbed by the guide members without adversely influencing the steering kinematics of the vehicle notwithstanding the elasticity in the suspension.

A further object of the present invention resides in the provision of an independent wheel suspension for vehicles utilizing approximately transversely extending guide members which may be manufactured and assembled in a relatively inexpensive and simple manner.

Still another object of the present invention resides in the provision of an independent wheel suspension for the steerable wheels of a motor vehicle utilizing guide structures composed of approximately transversely and longitudinally extending guide arms in which the transverse forces are absorbed substantially exclusively by the transverse guide arms and the longitudinal forces substantially exclusively by the longitudinal guide arms.

Another object of the present invention resides in the provision of a wheel suspension by means of guide members in which the transverse guide members are pivotally connected with the longitudinal guide members in such a manner that the transversely and longitudinally directed forces are transmitted to the vehicle frame or body separate from one another whereby the support of the guide members at the vehicle superstructure may be matched separately to these forces.

Still a further object of the present invention resides in the provision of an independent wheel suspension for the steerable wheels of motor vehicles in which the longitudinal and cross guide arms are elastically supported at the vehicle superstructure by means of rubber bushings of such design and shape as is most favorable for the absorption of the respective forces.

Still another object of the present invention resides in the provision of a wheel suspension of the type described hereinabove in which the transverse forces are absorbed in a relatively hard manner while the longitudinal forces are absorbed relatively softly.

Still a further object of the present invention resides in the provision of a wheel suspension in which the longitudinal spring support of the suspension is rendered relatively soft by the double interposition of resilient bushings.

Another object of the present invention resides in the provision of an independent wheel suspension especially for steerable wheels of motor vehicles which provides an improved roadability of the vehicle and greater driving comforts, particularly when driving over bad roads.

A further object of the present invention resides in the provision of an independent wheel suspension for the steerable wheels of a motor vehicle which not only achieves the objects mentioned hereinabove, but also assures a very accurate steering of the vehicle uninfluenced by any elastic connections in the wheel suspension.

A still further object of the present invention resides in the provision of a wheel suspension for motor vehicles which permits a lay-out of the support base for the individual guide structures that is very large in order to reduce the occurring forces to a considerable extent, thereby contributing considerably to the feasibility of a lightweight construction for the vehicle.

Another object of the present invention is the provision of individual guide members that are properly engineered for their respective functions yet are very simple in structure and shape as well as easy to manufacture.

A further object of the present invention resides in the provision of an independent wheel suspension for steerable wheels of motor vehicles which far-reachingly compensates inaccuracies not only in the guide members, but also in the frame and body tolerances.

Another object of the present invention resides in the provision of an independent wheel suspension for the steerable wheels of motor vehicles which permits by simple means the adjustment of the caster and/or camber of the wheel.

These and further objects, features and advantages of the present invention will become more obvious from the following description when taken in connection with the accompanying drawing which shows, for purposes of illustration only, one embodiment in accordance with the present invention, and wherein FIGURE 1 is a perspective schematic view for a wheel suspension in accordance with the present invention;

FIGURE 2 is a plan view on the upper guide member in accordance with the present invention, partly in cross section through the pivotal connections and joints thereof, and FIGURE 3 is a plan view on the lower guide member in accordance with the present invention, also partly in cross section through the pivotal connections and joints thereof.

Referring now to the drawing wherein like reference numerals are used throughout the various views to designate like parts, and more particularly to FIGURE 1, in the wheel suspension schematically illustrated therein, the front wheel 10 is supported in a conventional manner on a steering pin 11 which is suspended at the vehicle superstructure 9 such as the frame or body of a self-supporting type body construction by means of a lower guide arm structure generally designated by reference numeral 12 and an upper guide arm structure generally designated by reference numeral 13. The lower guide arm structure 12 consists of a cross member 14 and of a longitudinal member 15, while the upper guide arm structure 13 consists of a cross member 16 and a longitudinal member 17. The cross members 14 and 16 of the two guide arm structures 12 and 13 are pivotally connected with the steering pin 11 by means of ball joints 18 and 19 or similar joints in such a manner that the wheel 10 can be steered about the approximately vertical axis determined by the joints 18 and 19. For that purpose, the steering pin 11 is connected with a steering lever 20 which is pivotally connected by means of joint 21 to a steering or tie-rod 22 which in turn is disposed parallel to the cross members 14 and 16 and is actuated by way of a joint 23 from the remaining steering linkage.

The longitudinal member or arm 15 of the lower guide structure 12 is connected to the cross member 14 of the lower guide structure 12 by means of an adjustable joint 24, preferably by the interposition of rubber, whereas a joint 25, preferably also by the interposition of rubber, is provided for the connectiotn of the longitudinal member or arm 17 of the upper guide structure 13 to the cross member or arm 16 thereof.

The longitudinal and cross members 15 and 14 of the lower guide structure 12 are supported in bearing supports 27 and 26 about a common horizontal axis $u$—$u$ extending in the vehicle longitudinal direction.

The cross member 16 and the longitudinal member 17 of the upper guide structure 13, in contrast thereto, swing or pivot about different axes, and more particularly, the cross member 16 swings within the bearing supports 28 about the axis $o_1$—$o_1$ and the longitudinal member 17 swings within a bearing support 29 about the axis $o_2$—$o_2$ whereby the arrangement is preferably made in such a manner that the axes of $o_1$—$o_1$ and $o_2$—$o_2$ intersect in a point O. The bearing support of the longitudinal members 15 and 17 of the lower and upper guide structures 12 and 13 within the bearings 27 and 29, respectively, takes place by the interposition of rubber elements which, as indicated in FIGURE 1 at 30 and 31, are constructed in such a manner that they absorb relatively softly the longitudinal forces $L_u$ and $L_o$ in the direction of the longitudinal members. The bearing support of the cross members 14 and 16 of the guide structures 12 and 13 within the bearings 26 and 28 takes place by the interposition of rubber elements which, however, as indicated schematically in FIGURE 1 at 32 and 33, are constructed in such a manner that they absorb in a relatively hard manner the transverse forces $Q_u$ and $Q_o$ in the direction of the cross members 14 and 16, that is, perpendicular or approximately to the axes $u$—$u$ and $o_1$—$o_1$. By reason of the parallel arrangement of the cross members 16, 14 to the steering rod 22, it is assured that the elastic bearing support of the guide structures cannot become effective in a harmful or adverse manner by influencing the wheel steering system.

As FIGURE 1 further illustrates, the cross member 16 of the upper guide structure 13 simultaneously serves for the support of the wheel spring 34, for example, in the form of a coil spring, the upper end of which is supported at the vehicle superstructure 9, such as the frame, body, or combined frame-body construction, which vehicle superstructure also carries—either directly or indirectly—the bearings 26, 27, 28 and 29.

Actual constructional embodiments for the upper and lower guide structures including the bearing supports thereof, are illustrated in detail in FIGURES 2 and 3. The lower guide arm structure 12 (FIG. 3) is again composed of transverse guide member or arm 14 and longitudinal guide member or arm 15, while the upper guide arm structure 13 (FIG. 2) is composed of transverse guide member or arm 16 and longitudinal guide member or arm 17. The cross members 14 and 16 are constructed as pressed or stamped sheet-metal parts whereas the longitudinal members 15 and 17 are constructed as rods or tubular elements.

As illustrated in FIGURE 2, the transverse guide member 16 of the upper guide structure 13 is supported within the joint generally designated by reference numeral 33 by means of a cross bolt 35 in the bearings 28 at the vehicle superstructure 9 by the interposition of rubber bushing 36 provided with lateral collars 36a. The bushing 36 thereby has a relatively slight radial wall thickness so that the cross member 16 is supported on the cross bolt 35 in a correspondingly hard manner.

The longitudinal member 17 is supported within the joint generally designated by reference numeral 31 by means of a rubber bushing 37 of relatively large radial thickness on a cross bolt 38 which is secured within the bearings 29 at the vehicle superstructure 9. Forces which act in the longitudinal direction of the longitudinal member 17 are therefore transmitted relatively softly to the bolt 38 and therewith to the vehicle superstructure 9.

In a similar manner as in bearing point 31, the longitudinal member 17 is furthermore connected to the cross member 16 within the connecting point generally designated by reference numeral 25 by means of bolt 39 and a rubber bushing 40 of relatively large radial thickness. Bolts and rubber bushings are arranged in such a manner that the axes thereof coincide with the longitudinal direction of the cross member 16.

Forces $Q_o$ acting in the transverse direction from the wheel on the guide member 13 are therefore transmitted in a relatively hard manner to the vehicle superstructure 9 exclusively by way of the relatively hard rubber bushing 36, whereas longitudinal forces $L_o$ are transmitted to the vehicle superstructure 9 in a very soft manner essentially in the longitudinal direction of the longitudinal member 17 by means of the rubber bushings 40 and 37 connected one behind the other and each itself already of relatively soft construction.

FIGURE 2 further shows the connection of a spring and/or shock absorber at the cross member 16 of the upper guide structure 13 by means of a transverse bolt 41 and a rubber bushing 42. One such connection each may be provided for the wheel spring and shock absorber.

By reason of the non-aligned or non-coaxial swinging axes of $o_1$—$o_1$ and $o_2$—$o_2$ intersecting each other at an angle, differences in the swinging movements of the longitudinal member 17 and of the cross member 16 of the upper guide arm structure 13 occur during spring deflections of the wheel which, however, are again compensated by the inclined positioning of these members within the rubber bushings 36, 37 and 40.

In a similar manner as the upper guide arm structure 13, the lower guide arm structure 12 is constructed as shown in FIGURE 3. The cross member or arm 14 of the lower guide structure 12 is supported within the joint generally designated by reference numeral 32 by means of a bearing bolt 43 and a rubber bushing 44 of relatively slight radial wall thickness within the bearings 26 at the vehicle superstructure 9. The bearing support of the longitudinal member 15 within the bearing point generally designated by reference numeral 30 takes place by means of a bearing bolt 45, the axis of which—in contrast to the bearing bolt 38 within the bearing point 31 of the upper guide structure 13—extends in the longitudinal direction of the vehicle and is coaxial with the axis of the bearing bolt 43 within joint 32 of the cross member 14. For the absorption of the longitudinal forces there is provided a rubber cushion 46, the main rubber masses of which are formed by ring or disk-shaped rubber parts 46a that have a relatively large radial and also axial dimension.

A rubber cushion in the form of a ring 47 is also arranged in the connecting point generally designated by reference numeral 24 between the longitudinal member 15 and the cross member 14 of the lower guide structure 12. The rubber ring 47 surrounds or encloses an eccentric disk 48 which is adjustably supported in the direction of rotation about an eccentric pin 49 at the cross member 14. By adjustment of the eccentric, the steering pin 11 of the wheel can be adjusted in a simple manner relative to the bearing points 32 and 30 of the lower guide structure 12 and therewith the caster angle may be readily adjusted. For example, the eccentric 48 may be rotated clockwise one quarter of a turn about the journal 49 to bring the journal 49 closer to the joint 27; thus the joint 18 of the caster pin 11 will be moved backward, that is, in the opposite direction to the direction of travel $f$. This will increase the inclination, rearwardly and downwardly, of the caster pin axis of the wheel. After adjustment, the eccentric may be clamped or rigidly held in its new position by any conventional means (not shown) such as a split ring as disclosed in the U.S. Patent to Paton 2,153,271 issued April 4, 1939. Similarly, rotation of the eccentric in the clockwise direction will incline the caster pin in the opposite direction. Of course, instead of an eccentric, any other adjusting mechanism may also be provided.

The position of the steering or tie-rod 22 and the connection thereof with the steering pin 11 is indicated in FIGURE 3 in dash and dot line, whereby the steering rod 22 extends parallel to the cross member 14 of the lower guide structure 12 and the cross member 16 of the upper guide structure 13. Transverse forces $Q_u$ transmitted from the road by way of the wheel to the lower guide arm structure 12 are again transmitted to the vehicle superstructure 9 in a relatively hard manner by way of the rubber bushing 44 whereas longitudinal forces $L_u$ are transmitted to the vehicle superstructure 9 in a relatively very soft manner by way of the rubber elements 47 and 46 connected one behind the other in series.

The cross members 14 and 16 are directed in the illustrated embodiment obliquely outwardly and rearwardly under an angle of more than 45° to the vehicle longitudinal axis, with an assumed driving direction indicated by the arrow $f$, whereas the longitudinal members 15 and 17 form an angle of less than 45° with the vehicle longitudinal axis. Such an arrangement is particularly suited for the absorption of forces at the steered front wheels of a motor vehicle. However, the cross and longitudinal members may also be directed in a different manner, for example, also in such a manner that the cross members are arranged perpendicular to the vehicle longitudinal axis and the longitudinal members parallel thereto.

Furthermore, the longitudinal members may also be directed, instead of rearwardly, in the forward direction.

While I have shown and described one embodiment in accordance with the present invention, it is understood that the same is not limited thereto, but is susceptible of numerous changes and modifications, of which some were briefly mentioned above.

Thus, while I have shown and described in detail only one embodiment, it is understood that the present invention is not limited thereto, but is susceptible of numerous changes and modifications within the spirit and scope thereof as known to a person skilled in the art, and I therefore, do not wish to be limited to the details shown and described herein, but intend to cover all such changes and modifications as are encompassed by the scope of the appended claims.

I claim:
1. A wheel suspension for vehicles having a vehicle superstructure, comprising:
wheel guide means of the triangular guide arm type of construction,
said wheel guide means each including cross arm means and longitudinal arm means,
and means pivotally connecting said arm means with one another and with said vehicle superstructure in such a manner that said cross arm means absorbs substantially alone the transverse forces while the longitudinal arm means absorbs substantially alone the longitudinal forces,
said connecting means including elastic means elastically connecting said cross and longitudinal arm means with said vehicle superstructure,
the means operatively connecting the longitudinal guide arm means with the cross guide arm means including elastic means interposed therebetween,
the connecting means connecting the longitudinal and cross arm means with one another being adjustable to enable adjustment of the caster of the wheel and including eccentric means operatively connecting a respective longitudinal guide arm means with a corresponding cross arm means and having an axis extending essentially vertical to the plane of said wheel guide means.

2. In a wheel suspension, especially for motor vehicles having a vehicle superstructure, in which wheels are suspended from the vehicle superstructure by means of superposed guide arm structures of triangular type of construction, each including a longitudinal guide arm and a cross guide arm,
the improvement essentially consisting of means operatively connecting the longitudinal and cross arms of a guide arm structure with one another and with said vehicle superstructure in such a manner that the cross arm absorbs alone at least the major portion of the transverse forces while the longitudinal arm absorbs alone at least the major portion of the longitudinal forces,
said connecting means including elastic means pivotally and elastically connecting the longitudinal and cross arms with said vehicle superstructure to provide a relatively hard absorption of the transverse forces and a relatively soft absorption of the longitudinal forces,
the wheel being carried by the cross arm and the longitudinal arm being connected to the cross arm by the interposition of elastic elements,
the connecting means connecting the longitudinal and cross arms with one another including adjustable means provided with eccentric means to enable adjustment of the caster of the wheel, said eccentric means having an axis extending essentially vertical to the plane of said wheel guide means.

3. In a wheel suspension, especially for motor vehicles having a vehicle superstructure, in which wheels are suspended from the vehicle superstructure by means of superposed guide arm structures of triangular type of construction, each including a longitudinal guide arm and a cross guide arm,
the improvement essentially consisting of means operatively connecting the longitudinal and cross arms of a guide arm structure with one another and with said vehicle superstructure in such a manner that the cross arm absorbs alone at least the major portion of the transverse forces while the longitudinal arm absorbs alone at least the major portion of the longitudinal forces,
the connecting means connecting the longitudinal and cross arms with one another including adjustable means to enable adjustment of the caster of the wheel,
only one of two superposed guide arm structures being provided with an adjustable connecting means between the respective longitudinal and cross arms thereof,
the longitudinal and cross arms of one of two superposed guide arm structures being operatively connected with one another by the interposition of elastic means and eccentric means having an approximately vertical axis and forming part of the adjustable connecting means, and the longitudinal and cross arms of the other guide arm structure being operatively connected with one another by an elastic bushing having an axis extending substantially in the direction of the cross arm thereof.

4. A wheel suspension for vehicles having a vehicle superstructure, comprising:
wheel guide means of the triangular guide arm type of construction,
said wheel guide means each including cross arm means and longitudinal arm means,
and means including joint means pivotally connecting said arm means with one another and with said vehicle superstructure in such a manner that said cross arm means absorbs substantially alone the transverse forces while the longitudinal arm means absorbs substantially alone the longitudinal forces,
said connecting means including elastic means elastically connecting said cross and longitudinal arm means with said vehicle superstructure,
the elastic means accommodated within the joint means connecting a longitudinal arm means with the vehicle superstructure being relatively soft for the absorption of the longitudinal forces and the elastic means accommodated within the joint means connecting a cross arm means with the vehicle superstructure being constructed relatively hard for the absorption of transverse forces,
the means operatively connecting the longitudinal guide arm means with the cross guide arm means including elastic means interposed therebetween,
the wheel being carried by the cross arm means and the longitudinal arm means being connected to the cross arm means by the interposition of an elastic element,
the longitudinal and cross arm means of the lower one of two superposed guide arm structures being operatively connected with one another by the interposition of elastic means and adjustable eccentric means having an approximately vertical axis, and the longitudinal and cross arm means of the upper guide arm structure being operatively connected with one another by a rubber bushing having an axis extending substantially in the direction of the cross arm means.

5. A wheel suspension for vehicles having a vehicle superstructure by means of one or two superposed guide structures of the triangular guide arm type of construction, comprising:
two superposed wheel guide means of triangular guide arm type of construction,
said wheel guide means each including cross arm means and longitudinal arm means,
and means pivotally connecting said arm means with one another and with said vehicle superstructure to absorb the transverse forces substantially alone by said cross arm means and the longitudinal forces substantially alone by said longitudinal arm means,
said connecting means including elastic means elastically connecting said cross and longitudinal arm means with said vehicle superstructure,
the elastic means connecting a cross arm means with the vehicle superstructure including elastic bushing means of relatively slight radial wall thickness whereas the elastic means connecting the longitudinal guide arm means with the vehicle superstructure include elastic bushing means of relatively large radial wall thickness, the means operatively connecting the longitudinal guide arm means with the cross guide arm means being realized by the interposition of elastic means, and the wheel being carried substantially by the cross guide arm means, the connecting means connecting the longitudinal and cross guide arm means with one another being adjustable to enable adjustment of the caster and camber of the wheel, the longitudinal and cross guide arm means of the lower one of two superposed guide arm structures being operatively connected with one another by the interposition of elastic means and eccentric means, and the longitudinal and cross guide arm means of the other upper guide arm structure being operatively connected with one another by a rubber bushing having an axis extending substantially in the direction of the cross guide arm means thereof, the joint axes of the joint means operatively connecting a longitudinal and cross guide arm means of at least one guide arm structure at the vehicle superstructure by the interposition of the elastic means extending at an angle to one another.

6. A wheel suspension for vehicles having a vehicle superstructure, comprising:

two superposed wheel guide means each of triangular guide arm type of construction, said wheel guide means each including cross arm means and longitudinal arm means, and means operatively connecting longitudinal and cross arm means with one another and with said vehicle superstructure to absorb at least the major part of the transverse forces by said cross arm means and at least the major part of the longitudinal forces by said longitudinal arm means, said connecting means including joint means provided with elastic means elastically connecting said cross and longitudinal arm means with said vehicle superstructure and with one another, the longitudinal and cross arm means of one of the two guide arm structures being operatively connected with one another by the interposition of eccentric means, and the longitudinal and cross arm means of the other guide arm structure being operatively connected with one another by a rubber bushing having an axis extending substantially in the direction of the cross arm means thereof, the joint axes of the joint means operatively connecting the longitudinal and cross arm means of at least one guide arm structure at the vehicle superstructure by the interposition of elastic means extending at an angle to one another, and both the cross arm means and longitudinal of one of two superposed guide arm structures being inclined to the vehicle longitudinal direction.

7. A wheel suspension for vehicles having a vehicle superstructure, comprising:

wheel guide means of the triangular guide arm type of construction extending in a substantially horizontal plane and including a first arm means and a second arm means, first connecting means connecting each of said arm means with said vehicle structure, second connecting means connecting said arm means with each other and being adjustable to enable adjustment of the caster of the wheel, including eccentric means having an axis extending substantially normal to the plane of said wheel guide means.

8. A wheel suspension for vehicles having a vehicle superstructure, comprising:

wheel guide means of the triangular guide arm type of construction extending in a substantially horizontal plane and including a first arm means and a second arm means, first connecting means connecting each of said arm means with said vehicle superstructure, second connecting means connecting said arm means with each other and being adjustable to enable adjustment of the caster of the wheel, including eccentric means having an axis extending substantially normal to the plane of said wheel guide means and elastic means surrounding said eccentric means.

9. A wheel suspension for vehicles having a vehicle superstructure comprising:

wheel guide means of the triangular guide arm type of construction extending in a substantially horizontal plane and including a first arm means and a second arm means, first connecting means connecting each of said arm means with said vehicle superstructure, including elastic means for each of said arm means to form resilient connections, second connecting means connecting said arm means with each other and being adjustable to enable adjustment of the caster of the wheel, including eccentric means having an axis extending substantially normal to the plane of said wheel guide means.

References Cited by the Examiner

UNITED STATES PATENTS

| | | |
|---|---|---|
| 2,153,083 | 4/1939 | Griswold. |
| 2,153,271 | 4/1939 | Paton. |
| 2,305,795 | 12/1942 | Schieferstein _____ 280—124 X |
| 2,372,744 | 4/1945 | Sherman _____ 267—20 |
| 2,403,145 | 7/1946 | Ulrich _____ 267—20 X |
| 2,624,592 | 1/1953 | MacPherson _____ 280—96.2 |
| 2,840,385 | 6/1958 | Heftler. |
| 2,988,161 | 6/1961 | Herr _____ 280—124 X |
| 3,033,587 | 1/1962 | Perish _____ 280—124 X |
| 3,069,185 | 12/1962 | Holmstrom _____ 280—124 |
| 3,079,137 | 2/1963 | Schilberg _____ 280—96.2 X |
| 3,123,348 | 3/1964 | Hildebrandt _____ 267—20 X |
| 3,125,332 | 3/1964 | Peras _____ 280—96.2 X |
| 3,139,275 | 6/1964 | Burkitt _____ 280—96.2 X |

FOREIGN PATENTS 637,892   6/1962   Canada.

KENNETH H. BETTS, *Primary Examiner.*

BENJAMIN HERSH, *Examiner.*